(12) United States Patent
Brombach

(10) Patent No.: US 11,705,733 B2
(45) Date of Patent: Jul. 18, 2023

(54) METHOD FOR CONTROLLING AN EXCHANGE POWER BETWEEN A CHARGING INFRASTRUCTURE AND AN ELECTRICITY SUPPLY GRID

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/538,115

(22) Filed: Nov. 30, 2021

(65) Prior Publication Data
US 2022/0173594 A1    Jun. 2, 2022

(30) Foreign Application Priority Data
Nov. 30, 2020  (EP) .................................. 20210656

(51) Int. Cl.
*H02J 3/32* (2006.01)
*B60L 53/00* (2019.01)
(Continued)

(52) U.S. Cl.
CPC .............. *H02J 3/322* (2020.01); *B60L 53/00* (2019.02); *B60L 58/12* (2019.02); *B60L 58/22* (2019.02);
(Continued)

(58) Field of Classification Search
CPC ........ H02J 3/322; H02J 7/0014; H02J 7/0048; H02J 7/007; H02J 7/0013; H02J 7/0047; H02J 7/0063; H02J 7/0068; H02J 7/02; H02J 7/04; B60L 53/00; B60L 58/12; B60L 58/22; B60L 53/62; B60L 2260/54; B60L 53/63; B60L 53/67; B60L 55/00; B60L 58/13; B60L 53/60; Y02E 60/00;
(Continued)

(56) References Cited

U.S. PATENT DOCUMENTS

2011/0227534 A1* 9/2011 Mitsutani .............. H02J 7/0013
320/109
2013/0257146 A1* 10/2013 Nojima ................... B60L 53/22
307/9.1
(Continued)

FOREIGN PATENT DOCUMENTS

DE    102010002237 A1    8/2011

*Primary Examiner* — Lincoln D Donovan
*Assistant Examiner* — Alex W Lam
(74) *Attorney, Agent, or Firm* — Seed IP Law Group LLP

(57) ABSTRACT

A method for controlling an exchange of power between a charging infrastructure and an electricity supply grid is provided. A number of power units are formed as electric vehicle. Each power unit has a variable state of charge. From the individual states of charge of the power units, an overall state of charge can be determined. For the overall state of charge, a flexibility range in dependence on time can be predefined for a control time period. The flexibility range is spanned by a progression over time of an upper limit of the overall state of charge and a progression over time of a lower limit of the overall state of charge for the control time period. The flexibility range has range points which can be defined by a value of the overall state of charge and a point in time in the control time period.

18 Claims, 5 Drawing Sheets

(51) Int. Cl.
*B60L 58/22* (2019.01)
*B60L 58/12* (2019.01)
*H02J 7/00* (2006.01)

(52) U.S. Cl.
CPC .......... *H02J 7/0014* (2013.01); *H02J 7/0025* (2020.01); *H02J 7/0048* (2020.01)

(58) Field of Classification Search
CPC ..... Y02T 10/70; Y02T 10/7072; Y02T 90/12; Y02T 90/14; Y02T 90/167; Y04S 10/126; Y04S 30/12
See application file for complete search history.

(56) References Cited

U.S. PATENT DOCUMENTS

| | | | |
|---|---|---|---|
| 2014/0028254 A1* | 1/2014 | Shane | B60L 58/12 320/109 |
| 2017/0036560 A1 | 2/2017 | Schuelke et al. | |
| 2018/0178669 A1* | 6/2018 | Kudo | B60L 55/00 |
| 2020/0391614 A1* | 12/2020 | Maruno | B60L 53/11 |

\* cited by examiner

METHOD FOR CONTROLLING AN EXCHANGE POWER BETWEEN A CHARGING INFRASTRUCTURE AND AN ELECTRICITY SUPPLY GRID

BACKGROUND

Technical Field

The present disclosure relates to a method for controlling an exchange power between a charging infrastructure and an electricity supply grid. The disclosure also relates to a charging infrastructure. In particular, the disclosure also relates to a fleet with such a charging infrastructure.

Description of the Related Art

Fleets comprising multiple electric vehicles are known. Such fleets can be used commercially, the electric vehicles often being used, at least predominantly, at a certain time of day, for example during daytime. After they have performed their activity, that is to say for example in the evening, these electric vehicles return to their charging station. In particular, each electric vehicle returns to a charging terminal in order to be charged. In the example given, the charging would therefore take place at night. However, other time periods or cycles also come into consideration, for example over a week.

All of these charging terminals together are then part of a charging infrastructure. This charging infrastructure is also connected to an electricity supply grid, in order to draw from it the electrical power for charging the electric vehicles. However, it also comes into consideration in principle that, for a time, the electric vehicles deliver power into the electricity supply grid via the charging infrastructure, in order for example to serve as a power buffer in time periods of great power demand.

Because they comprise many electric vehicles, such fleets may draw from or temporarily feed into the electricity supply grid a significant amount of power. Furthermore, such electric vehicles of commercially used fleets must usually be charged every day, although there are also other cycles, and so there is a great demand for electrical power, which may involve correspondingly high procurement costs.

It could therefore be advisable to specifically control such fleets appropriately, in order to carry out the power drawing from the electricity supply grid in suitable time periods and, if appropriate, to provide electrical power for grid support in other time periods.

Although a fleet could in principle be controlled in this way in a coordinated manner, it should nevertheless be noted that there are diverse electric vehicles, and consequently diverse electrical storage units, and they must be coordinated. Particularly, different properties or states of the electrical storage units may lead to different power limitations for the fleet overall. Consequently, it is not possible for any electrical power whatsoever to be drawn from or fed into the electricity supply grid, but instead corresponding particular circumstances are to be taken into consideration. However, as far as the electricity supply grid is concerned, these particular circumstances are not readily known, and must nevertheless be taken into account.

As far as the electricity supply grid is concerned, in particular from the viewpoint of an electricity marketer, the planning of a power exchange would however be advisable. Particularly, it is desirable to be able to give at least a day in advance reliable planning of how much power is to be provided at what times for such a fleet of electric vehicles, and when supporting power provided by such a fleet can be expected.

In the European priority application, the European Patent Office searched the following prior art: DE 10 2010 002 237 A1, US 2017/036560 A1.

BRIEF SUMMARY

Provided are techniques in which a power exchange between a charging infrastructure and an electricity supply grid can be better planned and become more reliable.

Provided is a method that relates to the controlling of an exchange power between a charging infrastructure and an electricity supply grid. With the exchange power, electric vehicles are intended to be charged on the charging infrastructure, but power may also be temporarily fed into the electricity supply grid from these electric vehicles, or other storage units of the charging infrastructure. To this extent, a charging infrastructure for electric vehicles is assumed. Coming into consideration as vehicles are not only buses, trucks and passenger cars but also other vehicles, for example ferries. The charging infrastructure with the electric vehicles may be referred to as a fleet.

Multiple power units can be connected to the charging infrastructure for delivering or taking up electrical power, in order to exchange electrical power between the power units and the electricity supply grid via the charging infrastructure. A number of the power units are in each case formed as electric vehicles, and so multiple electric vehicles can in each case be connected to the charging infrastructure in order to exchange electrical power between the electric vehicles and the electricity supply grid via the charging infrastructure and thereby charge or discharge the electric vehicles. The charging infrastructure is essentially intended for charging electric vehicles and each electric vehicle correspondingly forms a connectable power unit. However, it also comes into consideration that, in addition, an electrical storage unit which is not part of an electric vehicle is connected to the charging infrastructure. Such an electrical storage unit may be intended for providing additional support, but may also be a reserve storage unit for electric vehicles.

Each power unit consequently has a variable state of charge, which can in each case be taken into consideration as an individual state of charge when the power unit is connected to the charging infrastructure. Of course, each power unit has a state of charge irrespective of whether or not it is connected to the charging infrastructure. Here, however, the term individual state of charge only describes in each case a state of charge of a power unit that is connected to the charging infrastructure.

From the individual states of charge of the power units, an overall state of charge can be determined, and this consequently only depends on the states of charge of the power units that are connected in each case to the charging infrastructure. The individual states of charge consequently only concern such states of charge that are to be taken into consideration.

It is also provided that, for the overall state of charge, a flexibility range can be predefined for a control time period. This flexibility range spans a range, in dependence on time, in which the overall state of charge may occur. In graphic terms, this flexibility range therefore forms an area in a time/overall-state-of-charge diagram.

This flexibility range is spanned by a progression over time of an upper limit of the overall state of charge and a progression over time of a lower limit of the overall state of charge for the control time period. In other words, the area of the graphic example mentioned is predefined by this upper limit and this lower limit.

The flexibility range has range points which can in each case be defined by a value of the overall state of charge and a point in time in the control time period. In other words, each point in the area of the graphic example mentioned is a range point. All of the points between the upper limit and the lower limit may be range points, including these limits. Theoretically, an infinite number of range points may be provided; for practical considerations, it will be sufficient to consider a finite number of range points.

In the control time period, which in the graphically given diagram may form the time axis, most of the power units should be connected to the charging infrastructure in order to be charged. For the example that the electric vehicles are underway during daytime and return in the evening in order to be charged up at night, this corresponding time period in the night for charging the vehicles is the control time period.

It is also proposed that a range point is in each case assigned an overall power interval. This overall power interval predefines in relation to the point in time and in relation to the overall charge of the assigned range point a range to be maintained for an overall exchange power to be exchanged between the charging infrastructure and the electricity supply grid. The flexibility range therefore predefines a range in which the overall state of charge can vary. Between the charging infrastructure and the electricity supply grid there may only be exchanged such power as to only ever result in overall states of charge that lie in the flexibility range. Therefore, to give a graphic extreme example, no power can be drawn from the electricity supply grid by the charging infrastructure if all of the electric vehicles are already fully charged, and the overall state of charge is consequently at the upper limit. Similarly, power cannot be fed into the electricity supply grid if all of the electrical storage units of the charging infrastructure are empty.

If, however, an overall state of charge is in the flexibility range, perhaps even far away from the two limits, that does not mean in the least that any amount of power whatsoever can be exchanged between the charging infrastructure and the electricity supply grid. Apart from limits that are given by a grid connection point between the charging infrastructure and the electricity supply grid, with it also being possible for a number of such grid connection points to be provided, particular circumstances of the electrical storage units must also be taken into account, however. Electrical storage units cannot be charged up or discharged at any rate whatsoever. In addition to physical limits, there are also limits that can only be exceeded by damaging the electrical storage unit. This therefore results in a further criterion to be satisfied, specifically that the maximum power that can be fed into the electricity supply grid is limited and also that the maximum power that can be removed from the electricity supply grid is limited. This results in an upper limit and a lower limit and these two limits form an overall power interval for the respective range point.

However, these power limits are not always the same for the electrical storage units. Thus, for example, an almost fully charged electrical storage unit can no longer be charged with as much power as an electrical storage unit that is for example only half full. Discharging may also depend on the respective state of charge. In order to take that into consideration, each range point is assigned an overall power interval.

The overall power intervals of all of the range points consequently span an overall power space over the flexibility range that is to be maintained for the overall exchange power. On the basis of the graphic example that the flexibility range is represented in a time/overall-state-of-charge diagram, these overall power intervals result in a three-dimensional representation. The overall power space then introduces a third dimension for the diagram. The overall power space is then like an arch over the flexibility range, and also under the flexibility range. At each range point, the distance between the upper arch and the lower arch is the respective overall power interval. The overall power space may be understood as the space between these two arches.

In order therefore to plan a progression over time of an exchange power, that is to say to predefine it as an exchange power progression over time, this overall power space forms a limit to be maintained. In other words, an exchange power progression over time must be designed such that it extends completely between these graphically given arches and at most may touch the upper or lower arch, which may also be referred to as the arch ceiling and the arch floor. This overall power space must also not be left laterally.

It has however been recognized that such an overall power space cannot be determined as a fixed default for the charging infrastructure, but is variable. In particular, each night there is a new overall power space, to keep with the graphic example of nighttime charging of the electric vehicles.

It has particularly been recognized that the individual states of charge of the power units, that is to say in particular the electric vehicles, must be taken into consideration. It is consequently proposed that the overall power interval of a range point depends on the individual states of charge of the power units on which the overall state of charge of the range point is based. Each range point therefore has an overall state of charge and this results from the individual states of charge, specifically in particular as a sum of these individual states of charge. It has however also been recognized that, for taking the overall power interval into consideration, the individual states of charge must likewise be taken into consideration. This results in the proposal that not only the overall state of charge but also the overall power interval depends on the individual states of charge.

Therefore, a range point has in each case an overall state of charge. This overall state of charge of the range point has an overall power interval and this overall power interval depends on the individual states of charge of this range point.

As a result, an overall power interval for each range point can therefore be determined very exactly and also adapted to the respective situation. As a result, the graphically given arch, that is to say the arch ceiling and arch floor, can be determined very exactly. It is particularly taken into consideration that a range point always has the same overall state of charge, but nevertheless can have different overall power intervals. In other words, one night, to take up this example again, a specific range point may have a specific overall power interval, and the next night it may have a different overall power interval, which for example is smaller or greater than the night before.

For example, a range point may be characterized by a specific time, for example 1 o'clock in the morning, and a specific overall state of charge, for example 50%. This range point given by way of example could lie approximately in the middle of the flexibility range in order to illustrate it further. This overall state of charge of 50% may be based on different individual states of charge. For example, all of the electrical storage units, which may synonymously also be referred to as rechargeable batteries, may have an individual state of charge of 50%. All of the storage units can then provide maximum charging and discharging power. Correspondingly, the maximum span is also obtained for the assigned overall power interval.

However, to give an extreme case, the overall state of charge of 50% may also be made up by half of the storage units being charged 100% and the other half of the storage units being charged 0%. The storage units charged 100% can then no longer draw any power, and so only half the charging power is obtained altogether for the overall power interval. Similarly, only half the discharging power is also obtained, since the other half of the storage units are empty and cannot deliver any power.

However, intermediate situations also come into consideration, if for example, to give once again a simple example, half of the storage units are charged 90% and the other half of the storage units are charged 10%. Also then, an overall state of charge of 50% is obtained. In the case of this example, although all of the storage units can still be both charged and discharged, since the storage units are almost full or almost empty their charging and discharging power is already reduced. For example, a charging power and discharging power of respectively 70% could be obtained.

It has consequently been recognized that the individual states of charge are also to be taken into consideration for the respective overall power interval, since they can lead to different results even when there is the same overall state of charge.

Of course, various further aspects are to be taken into consideration in relation to the aforementioned simplified example. These include that only units connected to the charging structure are to be taken into consideration, and consequently also result in changes if an electric vehicle is connected or disconnected. Capacity utilization of the charging infrastructure may furthermore also play a role, which may be additionally taken into consideration. Here, consideration may be given to the extent to which charging power or discharging power can be distributed between individual charging terminals, which may also be referred to as charging points. Further marginal aspects also come into consideration, such as for example if, for planning reasons, electrical storage units have their charge transferred within the charging infrastructure. Such transferring of charges is neutral with respect to the exchange power between the charging infrastructure and the electricity supply grid, but nevertheless limits the exchangeable power.

According to one aspect, it is proposed that an individual state of charge of a power unit is in each case assigned an individual power interval, which predefines for this individual state of charge a range to be maintained for the individual exchange power that the power unit can exchange with the charging infrastructure. Each power unit that is considered is consequently assigned an individual power interval. This limits the power that this power unit can deliver or draw. This individual power interval depends in this case on the state of charge of the power unit, that is to say on the individual state of charge. This individual power interval may for example be transferred to a central controller for evaluation, in particular together with the individual state of charge.

For this purpose, it is proposed that the overall power interval of a range point is in each case created in dependence on recorded, calculated and/or predicted individual states of charge of the range point and their assigned individual power intervals. A range point therefore has an overall state of charge and the individual states of charge of the connected power units also belong to the range point. These individual states of charge result in the overall state of charge of the range point. In addition, however, the individual power intervals are given, which consequently in each case represent an additional property or boundary condition of the individual state of charge concerned. These then form the basis for the creation of the overall power interval of the range point. In particular, the overall power interval corresponds essentially to a sum of the individual power intervals. Minor deviations in relation to the sum may be caused by losses. If these losses are ignored, it is sufficient to consider the sum. To this extent, this is based on an interval calculation in which intervals are added in such a way that the lower limits are added together to form a new lower limit and the upper limits are added together to form a new upper limit.

The individual states of charge taken as a basis may be recorded, that is to say in particular measured, but also calculated and/or predicted. Here it is particularly taken into consideration that finally an exchange power progression is intended to be determined, or in particular planned. For this purpose, the individual states of charge are therefore intended to be taken into consideration in advance, and so predicted individual states of charge are taken into consideration. Such individual states of charge can be predicted particularly by the behavior of the electric vehicles being anticipated in order to predict initial states of the individual states of charge at the beginning of the control time period. For further, later range points, a progression, that is to say a change of the respective individual state of charge, may also be predicted. This may for example be performed on the basis of a likely charging progression. In this case, there would be both predicted and calculated individual states of charge.

However, it also comes into consideration that actually recorded, in particular measured individual states of charge may also be used for later considerations that are not required for prediction, but for example for later matching.

According to one aspect, it is proposed that, for the determination of each overall power interval, in each case a positive overall power limit and a negative overall power limit are determined, in order in each case to take into consideration an asymmetry of the overall power interval. Here it has particularly been recognized that a distinction should be made between available charging power and available discharging power. This may on the one hand be because of the nature of the electrical storage units, which can be charged and discharged at different rates. It has however also been recognized that this may be because of the respective individual states of charge. Also, a charging infrastructure may be designed such that it has a different maximum charging power and maximum discharging power. This may be caused by the hardware setup, in which for example the charging converters in the vehicles are larger than the discharging converters.

It is particularly to be taken into consideration that the electrical storage units are more likely to be in a discharged state at the beginning of the control time period, and consequently cannot deliver much power but can draw considerable power. At the end of the control time period, they should be charged, and so they then no longer draw much power but can deliver considerable power. It is in this case proposed that the positive overall power limit limits the power that the loading infrastructure can draw as a maximum, and the negative overall power limit limits the power that the charging infrastructure can deliver as a maximum. In particular, it is proposed that it is taken into consideration that the individual power intervals can in each case be assigned a positive individual power limit and a negative individual power limit. As a result, the proposed taking into consideration of the possible asymmetry of the overall power interval can be carried out.

According to one aspect, it is proposed that the respective overall power interval is in each case determined in dependence on a recorded or predicted initial overall state of charge, which corresponds to the overall state of charge at the beginning of the control time period. It is also or alternatively proposed that the respective overall power interval is determined in dependence on recorded or predicted initial individual states of charge, which designate the individual states of charge at the beginning of the control time period. Furthermore, it is proposed for both variants that the respective overall power interval is in each case also determined in dependence on a power distribution specification, which predefines how an overall exchange power is divided among the individual power units.

For the prediction, it is consequently particularly important how the initial situation looks at the beginning of the control time period. If most of the storage units or all of the storage units are in a very discharged state, they can draw considerable exchange power, but can deliver rather less exchange power, and vice versa.

A differentiated statement can be made if not only the initial overall state of charge is determined but the individual states of charge at the beginning of the control time period are considered, that is to say the initial individual states of charge are considered. In this way it may be quite possible to determine an overall power interval at the beginning. This of course also depends on how good the prediction is.

If, however, the control period begins and the electrical storage units are correspondingly charged or, for a time, are also discharged to provide supporting power, this initial situation changes. If therefore the power distribution specification is known, this can be taken into consideration and the progression of the individual states of charge can be determined well on the basis of the initial individual states of charge. Then, the individual power intervals can also be determined well later, and from them the overall power interval can be deduced. Such a power distribution specification may for example be designed such that an exchange power is distributed uniformly among all of the electrical storage units. If the exchange power progression is known, the progression of the individual states of charge can consequently be calculated, or at least can be predicted, depending on how exactly the exchange power progression is known.

However, taking the power distribution specification into consideration may also help just on the basis of an initial overall state of charge, that is to say also whenever the initial individual states of charge are not known or have not been predicted. Specifically, a basic development of the individual states of charge over time may be able to be deduced from such a power distribution specification. Particularly whenever the power distribution specification is designed such that it controls the individual states of charge in such a manner that they come to match one another, it can be assumed that no individual state of charge is prematurely reached 100%. The respective overall power interval can be deduced from this. Specifically, to keep with the example, it can be deduced that the situation where one electrical storage unit or a number of electrical storage units is/are eliminated from taking up power does not occur prematurely.

According to one aspect, it is proposed that, for predefining an exchange power progression, a default range is determined. Such a default range corresponds to the flexibility range or is part thereof, that is to say a genuine subset. The default range may therefore be like the flexibility range, or smaller.

The default range consequently also has multiple range points, assigned to which in each case is an overall state of charge with a default power interval. Particularly, the default range has or can have the range points that the flexibility range likewise has, as long as they do not lie outside the default range. A default power interval is additionally assigned to these range points or the respective overall state of charge thereof. This default power interval may however differ from the overall power interval already described above, which is further explained below.

In any event, the default power intervals span an admissible default power space over the default range in which the exchange power progression is intended to lie. To this extent, here again there is spanned a space which corresponds to the arch space graphically described above, with an upper arch and a lower arch. To this extent, each default power interval also forms an overall power interval, but it is true for at least some of the default power intervals that they are determined in dependence on an unfavorable constellation of all of the individual states of charge of the range point, or that they are also or alternatively determined in dependence on an unfavorable progression of an exchange power. An unfavorable constellation may also be referred to synonymously as a non-optimum constellation, specifically not optimum for achieving a maximum overall power interval. Similarly, an unfavorable progression of an exchange power can be referred to synonymously as a non-optimum progression of an exchange power, specifically not optimum for achieving a maximum overall power interval.

This is based on the consideration that an overall power interval, specifically the default power interval, is to be determined although the underlying individual states of charge, and consequently the underlying individual power intervals, are not exactly known. Particularly, it is also intended here to make a prediction, in order then to be able to determine an exchange power progression. To this extent, here a default power interval is a prediction of an overall power interval.

In order therefore to ensure that an exchange power progression which specifically is intended to lie in this arch that is spanned by many default power intervals can nevertheless be specified, it is almost as it were that the most unfavorable case is assumed, or at least an unfavorable realistic case.

To this extent, a favorable constellation of all of the individual states of charge is that they all have the same individual state of charge in percentage terms. This then corresponds to the example described above, in which an overall state of charge of 50% is the result of equal individual states of charge, which themselves are also all 50%. To this extent, an unfavorable constellation is when the individual states of charge are very different. This is so because, as a result, the overall power interval is reduced. And such a reduced overall power interval is referred to here as the default power interval.

An unfavorable constellation of all of the individual states of charge may be one in which the standard deviation of the individual states of charge in percent lies above a reference value. The reference value may be in particular 10% or 20%. An unfavorable constellation is in particular one in which the individual states of charge have a maximum value, in particular 100%, or a minimum value, in particular 0%. On the basis of the overall state of charge of the range point considered, some of the individual states of charge are therefore set to 100% and some are set to 0%, such that they give in total the overall state of charge.

Likewise, the progression of the exchange power, that is to say the exchange power progression, may be unfavorable. A favorable exchange power progression is one which has a constant, specifically small, value over the entire control time period, in order to provide the predefined charging energy over the control time period. An unfavorable exchange power progression is in particular one in which the exchange power constantly has a maximum value which corresponds to a maximum power value predefined by the charging infrastructure. In particular, the exchange power has this maximum value at the beginning of the control time period, until a required amount of charging energy has been provided, that is to say in particular until all of the storage units have been charged.

With these unfavorable constellations, default power intervals, and consequently the default power space, are then determined for the default range for multiple range points, specifically in particular as a prediction. If the exchange power progression is then determined such that it lies in this default power space, it can then be ensured that this exchange power can then also actually be provided as predefined and planned by the exchange power progression, within the limits of the uncertainties of the prediction of course.

In particular, it is proposed that each default power interval forms a predicted overall power interval which has been predicted in dependence on a prediction of an initial overall state of power and/or a prediction of initial individual states of charge. This provides a possibility for predicting the exchange power progression, and this is based on predicted initial individual states of charge and/or a predicted initial overall state of power.

It is preferably also proposed here that the power distribution specification is taken into consideration. To this extent, particularly unfavorable individual power progressions are only assumed to be as unfavorable as they could also actually occur when the power distribution specification is taken into consideration.

According to one aspect, it is proposed that an exchange power progression is predefined in dependence on the prediction range such that the exchange power progression lies within the default power space. Determining this default power space is particularly intended for this. It is optionally proposed in this respect that, on request, it is checked whether a proposed exchange power progression which at least partially does not lie within the default power space but does at least lie within the overall power space.

This is based in particular on the idea that the default power space can be used as a means for predefining a safe range that can be used for predefining an exchange power progression. Particularly, such a default power space may be given by the charging infrastructure to an external unit, for example to a unit that uses an electricity marketer, which may also be referred to as a direct marketer. As a result, a reduced amount of information can be transferred, and the direct marketer can plan with it. In this way, a good result can be achieved, but possibly not an optimum result.

Consequently, first planning can be carried out by the direct marketer mentioned by way of example. If there is then the need still to improve this planning, that is to say for example to transfer even more power in a favorable time period, this would have the effect that a limit of the default power space is exceeded, which would not actually be admissible. However, then a follow-up check may be performed to ascertain whether, though the default power space is left, the overall power space is not left.

The direct marketer or the external unit that it uses for this has no information about the overall power space. This must in particular be inquired from the charging infrastructure. The charging infrastructure has very much better knowledge about the individual electric vehicles, and consequently also about the individual states of charge, that is to say the individual states of charge with their individual power intervals. Therefore, it is not possible from the outset to check the overall power space because it is only the charging infrastructure that can perform this check. However, it also comes into consideration that changing of the exchange power progression is only carried out later, specifically when there is more exact information in relation to the individual states of charge including the individual power intervals.

Particularly, the default power space may be used for predefining an exchange power progression which is for example enacted one day before the control time period or even longer before it. When this control time period actually begins the at least one day later, and the charging of the electric vehicles therefore actually begins, a need still to change the exchange power may then arise. If therefore it is then intended to change the exchange power progression that has been predefined, this can be reviewed with the aid of the present values, in particular recorded values, of the individual states of charge.

According to one aspect, it is proposed that, for the control time period, a requested exchange energy is given, indicating energy that the charging infrastructure has requested for the control time period for charging the power units. Incidentally, this may also be the result of a prediction, specifically which predicts how much energy demand there is when the electric vehicles have returned for charging to the charging infrastructure at the end of a cycle, for example in the evening. However, an empirical value may also be taken, for example a value that has occurred in the last comparable control time period. It is therefore intended for this energy to be provided and the control time period is available for this. Correspondingly, in a power determining step, the exchange power progression is determined in dependence on the requested exchange energy. The exchange power progression therefore predefines a progression of the exchange power for the control time period. Nevertheless, in order that energy should be charged into the storage units, it nevertheless comes into consideration that part of the exchange power progression is negative in order to provide the grid with supporting power. It is decisive that the overall integral of the exchange power progression over the control time period corresponds to the requested exchange energy.

It is a matter of fact, not only with respect to this aspect, that the exchange power progression is predefined in dependence on the requested exchange energy.

In any case, it is further proposed to predefine in a progression determining step an overall state-of-charge progression over time in dependence on the exchange power progression. The exchange power progression has therefore been determined and it predefines how the storage units overall are intended to be charged. This correspondingly results in a progression of the overall state of charge.

In an interval determining step, overall power intervals are determined for range points of the overall state of charge. Here, therefore, only the range points that lie on the overall state-of-charge progression need to be taken into consideration. The overall state-of-charge progression forms a line through the flexibility range, to stay with the graphic representation of the time/overall state-of-charge diagram. This line is consequently a selection from all of the range points, and only the overall power intervals for these range points have to be determined.

This determination may be carried out by also calculating with the aid of the power distribution specification how the individual states of charge behave over time. Consequently, it is then also known for each point in time how the individual power intervals develop, and the overall power interval can in each case be determined from these intervals.

In a checking step, it is then reviewed whether the exchange power progression predefined in the power determining step stays within the overall power intervals that have been predefined in the interval determining step. Basically, here the overall power intervals form a power band along the overall state-of-charge progression over time. The respective exchange power must lie within this band. This is a possibility for predefining the exchange power and for checking whether it satisfies the requirements, and consequently can also be implemented.

In particular, it is proposed that, while taking into consideration the overall power interval determined in the interval determining step, the power determining step is repeated if it has been found in the checking step that the exchange power progression has not stayed within the overall power intervals, and has therefore left the power band. Then, the steps may be repeated, and a correspondingly amended exchange power progression predefined.

The progression determining step, the interval determining step and the checking step are in this case repeated as often as it takes until it has been found in the checking step that the predefined exchange power progression stays within the overall power intervals. Mostly, however, a single iteration step should be sufficient, since, when checking that one or more overall power intervals have been exceeded, it is also found how much they have been exceeded, thus resulting in an advisable adaptation.

Alternatively, the progression determining step, the interval determining step and the checking step may be carried out in a closed default algorithm without iteration, and the predefining of the exchange power progression may take place while taking into consideration the overall power intervals by means of the default algorithm. It is therefore also possible to propose a closed solution. Particularly a numerical solution can be ascertained with modern computer programs. Otherwise, if appropriate, a corresponding system of equations may also be solved while linearizing the nonlinear elements.

According to one aspect, it is proposed that the power distribution specification, which predefines how an overall exchange power is divided among the individual power units, predefines the dividing of the overall exchange power among the individual power units in such a way that individual states of charge approximate to a mean state of charge of all the power units that are connected to the charging infrastructure. This can achieve the effect that, even under unfavorable initial conditions of the individual states of charge, an evening out of the individual states of charge can be achieved after some time. This has the effect that all of the power units have the greatest possible individual power intervals, and so a great overall power interval can result. Using such a power distribution specification may also be favorable for the prediction, specifically because as a result the prediction can correspondingly be based on such a favorable progression of the individual states of charge.

In particular, it is proposed that the power distribution specification is designed such that a standard deviation of the individual states of charge is reduced. A standard deviation is the average deviation from an empirical value. This may be understood here as the average deviation of the individual states of charge from an average state of charge, or be applied as such. It is consequently particularly proposed that storage units with individual states of charge above an average individual state of charge are charged to a lesser degree than storage units with an individual state of charge below the average individual state of charge. As a result, their disparities from the average individual state of charge are reduced, and as a result the standard deviation is reduced. As a result, the individual power intervals, and consequently also the overall power interval, of the respective range point can be increased.

According to one aspect, it is proposed that overall power intervals are determined or changed in dependence on electric vehicles arriving or departing during the control time period. Here it has particularly been recognized that changes may still occur even during the control time period, and that the arrival or departure of electric vehicles may be a significant variable, which is consequently taken into consideration. It may be taken into consideration by taking into consideration the individual states of charge which as a result are added or taken away.

According to one aspect, it is proposed that the power distribution specification, which predefines how an overall exchange power is divided among the individual power units, predefines the dividing of the overall exchange power among the individual power units in such a way that a positive partial exchange power with which a power unit is in each case charged is determined in dependence on a difference of the individual state of charge from a state of charge to be reached. In particular, this state of charge to be reached may be 100%, that is to say be a fully charged state of charge of the respective storage unit. The exchange power is therefore to be divided among the individual power units and this is not carried out according to the size of the power units, and therefore according to the size of the corresponding electrical storage units, but according to the disparity between the existing individual state of charge and the state of charge to be reached. This achieves the effect that storage units that are already well charged are charged less quickly than electrical storage units that are not yet charged to a very great extent. As a result, matching is also achieved.

At the same time, it is proposed that a negative partial exchange power with which the power unit is therefore discharged is determined in dependence on a difference of the individual state of charge from a discharged state of charge. Therefore, for the dividing of an exchange power for discharging the electrical storage units, that is to say for feeding into the electricity supply grid, the residual charge is considered. This has the effect that electrical storage units that are discharged to a great extent provide less power for feeding into the grid than storage units that are discharged less. Consequently, here too matching is achieved. It has particularly been recognized that, when dividing the power, different approaches are to be adopted for charging and discharging.

It is also or alternatively proposed that, with the default of a positive exchange power, in the case of which power is drawn from the electricity supply grid for charging the power units, power units that have a state of charge below a relative mean state of charge are charged with priority and/or are charged to a greater extent than power units that have a state of charge above the relative mean state of charge. Here, the present mean state of charge in each case is thus taken as a reference basis. Here, a state of charge in percentage terms may particularly be used. This provides a specification which is universally applicable, even in the case of storage units of different sizes. Also as a result of this, matching may be achieved.

Preferably, the priority charging may mean that only these power units, which are therefore below the mean state of charge, are charged. As a result, matching can be enforced. To this extent, here there is a non-linear division, which can have the effect that complete matching, specifically a state in which all of the individual states of charge then correspond to the mean state of charge, may be reached well before the end of the control time period.

Charging power units to a greater extent may mean for example that they receive at least in percentage terms 1.5 times or at least in percentage terms twice as much power than the power units that lie above the mean state of charge.

It is also proposed that, with the default of a negative exchange power, in the case of which power is fed into the electricity supply grid for discharging the power units, power units that have a state of charge above the relative mean state of charge are discharged with priority and/or discharged to a greater extent than power units that have a state of charge below the relative mean state of charge. Here, consequently, an analogous approach is adopted and the explanations on the action taken when there is a default of a positive exchange power apply analogously. Particularly, here too it has been recognized that charging on the one hand and discharging on the other hand are to be considered in a differentiated manner.

According to one aspect, it is proposed that it is reviewed for the overall state-of-charge progression over time whether a target overall state of charge predefined at the end of the control time period as the overall state of charge to be reached can be reached and/or whether target individual states of charge predefined for individual states of charge to be reached at the end of the control time period can be reached. To this extent, a review is performed here to ascertain whether particularly the predefined exchange power progression has led to the desired charging situation. Here it has particularly been recognized that both losses and wrongly assumed initial states of charge can lead to deviations. These should be detected as early as possible in order to be able to make corresponding adjustments.

In particular, it is proposed that the respective review is carried out at one or more checking points in time in the control time period. Thus, a first time phase may be reviewed, and then it may be anticipated how the further progression will develop. Deviations that have occurred up until a checking point in time can be extrapolated to the remaining time.

It is also or alternatively proposed that, if it has been detected that the target overall state of charge or at least a target individual state of charge cannot be reached, the overall power progression is changed, the exchange power progression is changed and/or the power distribution specification is adapted. The overall power progression may be changed particularly by changing the exchange power progression. However, it also comes into consideration that power is supplied in some other way, for example from reserve storage units of the charging infrastructure.

If the target, specifically the target overall state of charge or at least a target individual state of charge, is not reached, this may be caused by the power distribution specification. It may then come into consideration that the target can nevertheless still be achieved without changing the exchange power progression. This is obvious; if a target individual state of charge cannot be reached, it is then changed to a correspondingly greater extent by means of adaptation of the power distribution specification.

But also reaching the target overall state of charge may be caused by an unfavorable division of power having the effect that power restrictions which can be avoided with a different distribution may occur due to individual states of charge.

According to one aspect, it is proposed that, for a control time period and in relation to a planning point in time that lies before the control time period, in particular at least a day before the control time period, the flexibility range with the overall power space and/or the default range with its default power space is determined by the charging infrastructure for the planning of an exchange power progression and is transferred to an external unit, in particular to a power supplier. Consequently, a prediction is prepared for an exchange power progression in which the overall power time period, or in particular the default power time period, is transferred to an external unit intended to plan the exchange power progression.

It is correspondingly proposed that, in the external unit, an exchange power progression is predefined in dependence on the flexibility range and/or the default range for the control time period.

In addition, a requested exchange energy may also be taken into consideration for this. This requested exchange energy, or a corresponding value, may be additionally transferred to the external unit by the charging infrastructure.

The external unit can then on the basis of this predefine the exchange power progression and it is proposed in this respect that, in the control time period, a power exchange between the charging infrastructure and the electricity supply grid is carried out according to the predefined exchange power progression.

This creates a tool which is easy to handle but nevertheless gives due consideration to boundary conditions and with which the charging infrastructure needs only to transfer the most necessary information to the external unit, that is to say in particular a direct marketer. The latter can then on the basis of this predefine an exchange power progression comparatively freely, while taking its own interests into consideration, which may concern grid stability but also procurement costs. Only the overall power space or the default power space needs to be taken into consideration.

According to the disclosure, a charging infrastructure is also proposed. Such a charging infrastructure has a control device, which has at least one interface for the exchange of information, specifically in particular with an external unit such as a direct marketer or grid operator. The charging infrastructure is prepared for performing at least a method according to one of the embodiments described above. In particular, a corresponding program may be implemented for this in the control device.

BRIEF DESCRIPTION OF THE SEVERAL VIEWS OF THE DRAWINGS

The disclosure is described in more detail below by way of example on the basis of embodiments with reference to the accompanying figures.

DETAILED DESCRIPTION

Figure 1:
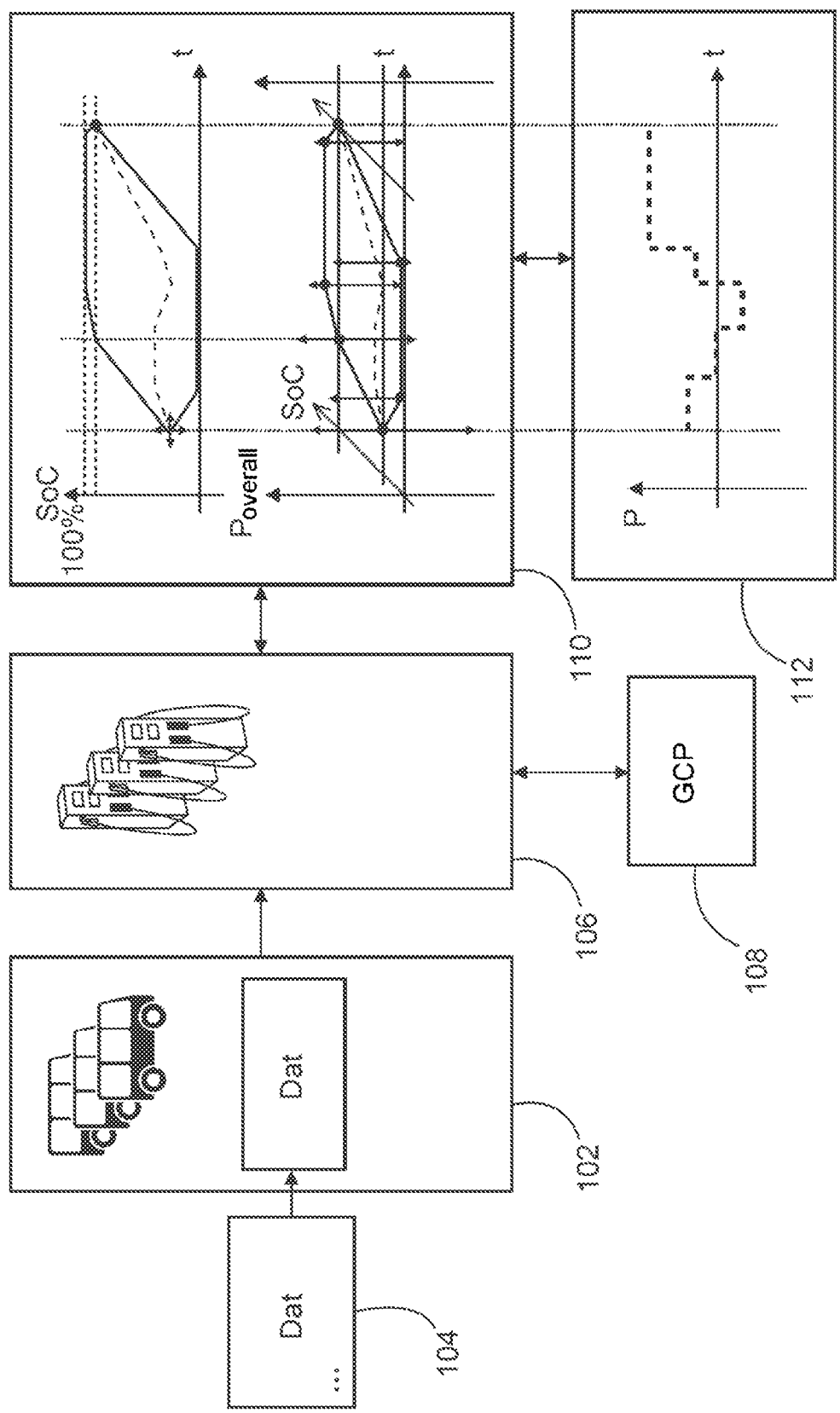
FIG. 1 shows a flow diagram for illustrating the proposed method.

The flow diagram of FIG. 1 is intended to explain the basic sequence of the proposed method. One idea of the method is that of utilizing storage capacities of a fleet comprising electric vehicles in order in this way to make power available to an electricity supply grid, for a time, on a demand-dependent basis and also of specifically controlling the drawing of electrical power from the supply grid in order for charging the storage units of the electric vehicles of the fleet, while taking into consideration the electricity supply grid. The method may also be used to achieve electricity price optimization. The fleet may thus be controlled such that it draws the required charging current as inexpensively as possible and at the same time complies with the technical boundary conditions. It has particularly been recognized that good planning of the technical resources is important for this, and this can be achieved using the proposed method.

The fleet of electric vehicles is represented by the fleet block 102. The fleet block in this case contains information in relation to the electric vehicles.

In addition, an input data block 104 is illustratively shown. This input data block 104 particularly comprises information or data that are greatly subject to change, in particular such information or data that may change daily and/or may be updated daily. This includes a timetable for the electric vehicles, if one is present, which may take the form of a bus timetable if the electric vehicles of the fleet are electric buses.

The forecast or prediction may be created by the fleet block 102 and passed to a charging infrastructure of the fleet. This charging infrastructure is represented by the infrastructure block 106. The infrastructure block 106 may in this case contain information in relation to the charging infrastructure, specifically in particular a maximum charging power, which may be predefined by corresponding charging terminals. These charging terminals are likewise part of the charging infrastructure.

Also provided is a grid connection block 108, which can particularly make available information about the electricity supply grid and about grid connection points that are used. The grid connection points are those by way of which the charging terminals are ultimately connected to the electricity supply grid. In this case, the charging infrastructure may be connected to the electricity supply grid by way of one or more grid connection points.

A charging controller, which may be referred to as an aggregator and may be contained in the infrastructure block 106, can create a flexibility range or default range. This is illustrated in the aggregation block 110.

Further details of this and also of the lower diagram of the aggregation block, and also of the exchange power block 112 shown under the aggregation block 110, are explained in more detail further below together with FIG. 2.

The exchange power block 112 in any event predefines an exchange power progression.

Figure 2:
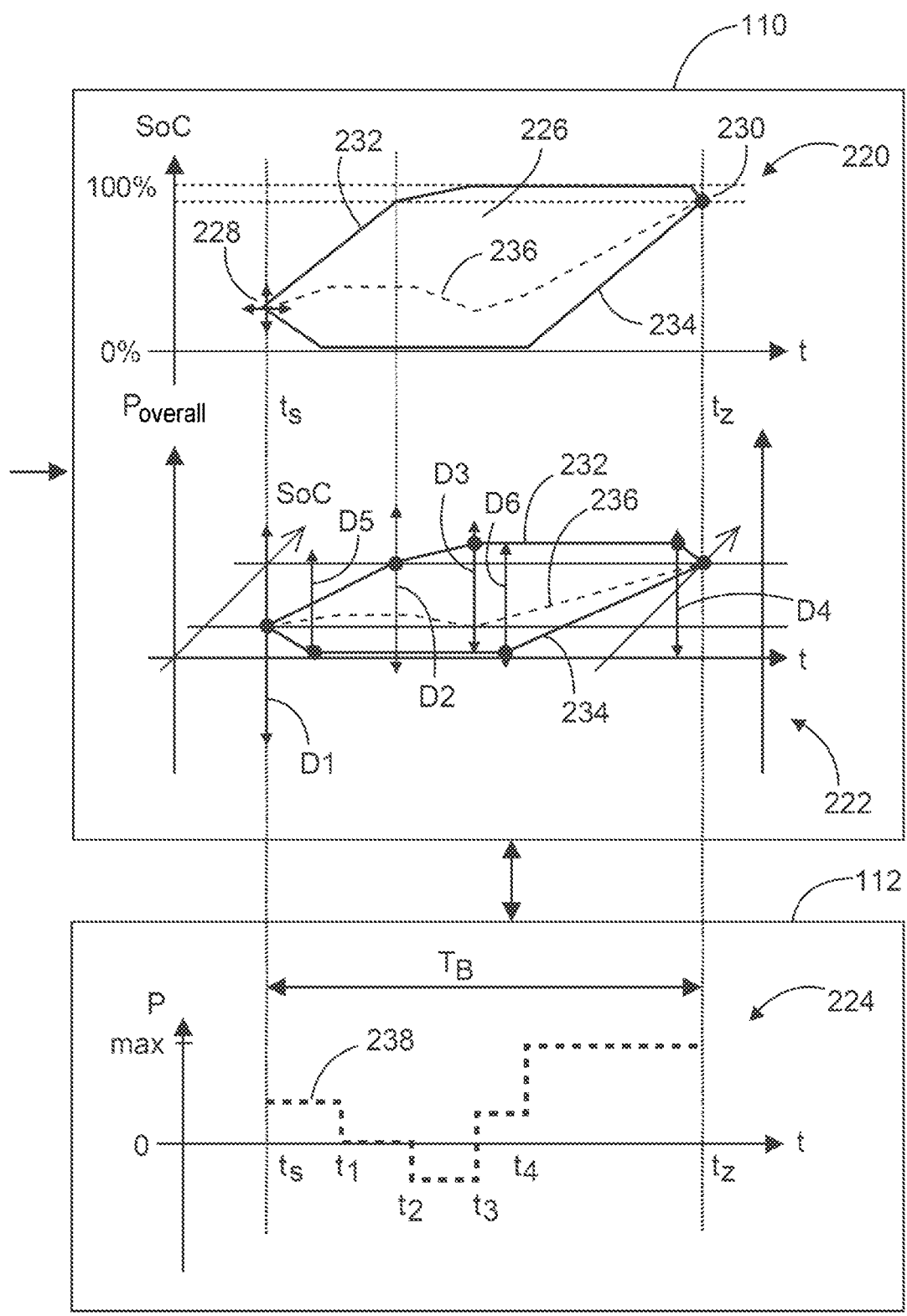
FIG. 2 shows a detail of the flow diagram of FIG. 1 for illustrating a flexibility range.

FIG. 2 shows a detail of the flow diagram of FIG. 1, specifically the aggregation block 110 and the exchange power block 112. The aggregation block 110 has in the upper region a state-of-charge diagram 220, which illustrates a flexibility range. In the lower region of the aggregation block 110, a variation diagram 222 is shown, based on the state-of-charge diagram 220 and additionally indicating by way of example a pair of variation possibilities for exchange power.

Shown in the exchange power block 112 is an exchange power diagram 224, which illustrates a possible progression of an exchange power over time, that is to say an exchange power progression. All of these three diagrams, specifically the state-of-charge diagram 220, the variation diagram 222 and the exchange power diagram 224 have the same time axis. Particularly, a starting charging time $t_S$ and a target charging time $t_Z$ for the state-of-charge range are depicted for purposes of illustration, and these points in time are also depicted in the other two diagrams by corresponding vertical lines. The starting charging time $t_S$ and the target charging time $t_Z$ thus span a provision time period $T_B$, which is only depicted in the exchange power block 112 for the sake of better clarity and which corresponds to the control time period or forms a control time period.

In the state-of-charge diagram 220, in principle the sum state of charge SoC over time t, which can also be referred to as the overall state of charge, is plotted. In this diagram, the flexibility range 226 is shown. It begins with a starting charging point 228 and ends with a target charging point 230. The starting charging point 228 is characterized by a value of the overall state of charge SoC and the starting charging time $t_S$. Both the height of the sum state of charge and the starting charging time $t_S$ may vary and are preferably determined by a prediction.

From the starting charging point 228, the overall state of charge SoC then runs to the target charging point 230. The target charging point 230 is characterized by the target charging time $t_Z$ and by the associated value of the overall state of charge SoC.

While the starting charging time $t_S$ is variable and depends on when the electric vehicles have actually returned to the fleet, the target charging time $t_Z$ can be fixed quite exactly, specifically when the electric vehicles depart on schedule.

The flexibility range 226 has a time-dependent upper limit 232 and a time-dependent lower limit 234. The time-dependent upper limit 232 may, for a time, reach the value of 100%. Then, all of the electrical storage units would be completely fully charged. Furthermore, the lower limit 234 may, at least for a time, reach the lower value of 0%. This however serves for illustration and it is often not advisable to completely discharge all of the storage units, because they could be damaged as a result. Consequently, a value other than 0%, for example 20%, may also be chosen as the minimum value of the lower limit 234. The same applies to the upper limit 232, for which a maximum value may be chosen for example at 90% instead of at 100%. This minimum value and this maximum value may also be chosen in dependence on corresponding values of the individual electrical storage units.

The state-of-charge diagram 220 consequently illustrates that the upper limit 232 and the lower limit 234 span a flexibility range 226, in which the overall state of charge can vary. For this, an overall state-of-charge progression 236 is depicted by way of example. The overall state of charge may be referred to synonymously as the total state of charge.

The variation diagram 222 contains the state-of-charge diagram 220, with the coordinate axis for the overall state of charge SoC being directed into the plane of the drawing. The time axis has remained and a coordinate axis for the power P has been added. This power P indicates in the variation diagram 222 at which corner point of the upper limit 232 or a lower limit 234 the amount of exchange power that can be delivered or drawn. For this, the double-headed arrows D1-D6 are depicted.

The double-headed arrows D1-D6 indicate possibilities and help to define a framework in which the exchange power can then actually be varied.

Therefore, a progression of an exchange power, that is to say an exchange power progression 238, is shown by way of example in the exchange power diagram 224 of the exchange power block 112. Accordingly, at the starting charging time $t_S$, the exchange power, and consequently the exchange power progression 238, begins with a positive value. Therefore, power is drawn from the electricity supply grid and is used for charging the storage units. Correspondingly, the overall state of charge or the overall state-of-charge progression 236 increases. This can be seen both in the state-of-charge diagram 220 and the variation diagram 222. At the point in time $t_1$, the exchange power progression 238 falls to zero, and correspondingly the overall state-of-charge progression 236 has a horizontal region.

At the point in time $t_2$, it has been planned, therefore predicted, to feed power into the electricity supply grid, and this is then also implemented, because a particularly high demand has been predicted here, possibly even resulting from the fact that at nighttime, when actually little power is required, a large generator is switched off, so that nevertheless there may be a power demand in the electricity supply grid.

This negative exchange power from the point in time $t_2$ is also evident by a falling edge in the overall state-of-charge progression 236.

At the point in time $t_3$, the exchange power is again changed to a positive value, and correspondingly the overall state of charge increases again. At the point in time $t_4$, the exchange power is once again increased, so that, from $t_4$, the overall state-of-charge progression 236 also rises somewhat more steeply. In this way, finally all of the storage units become fully charged, whereby the overall state-of-charge progression 236 reaches the target charging point 230.

Figure 3:
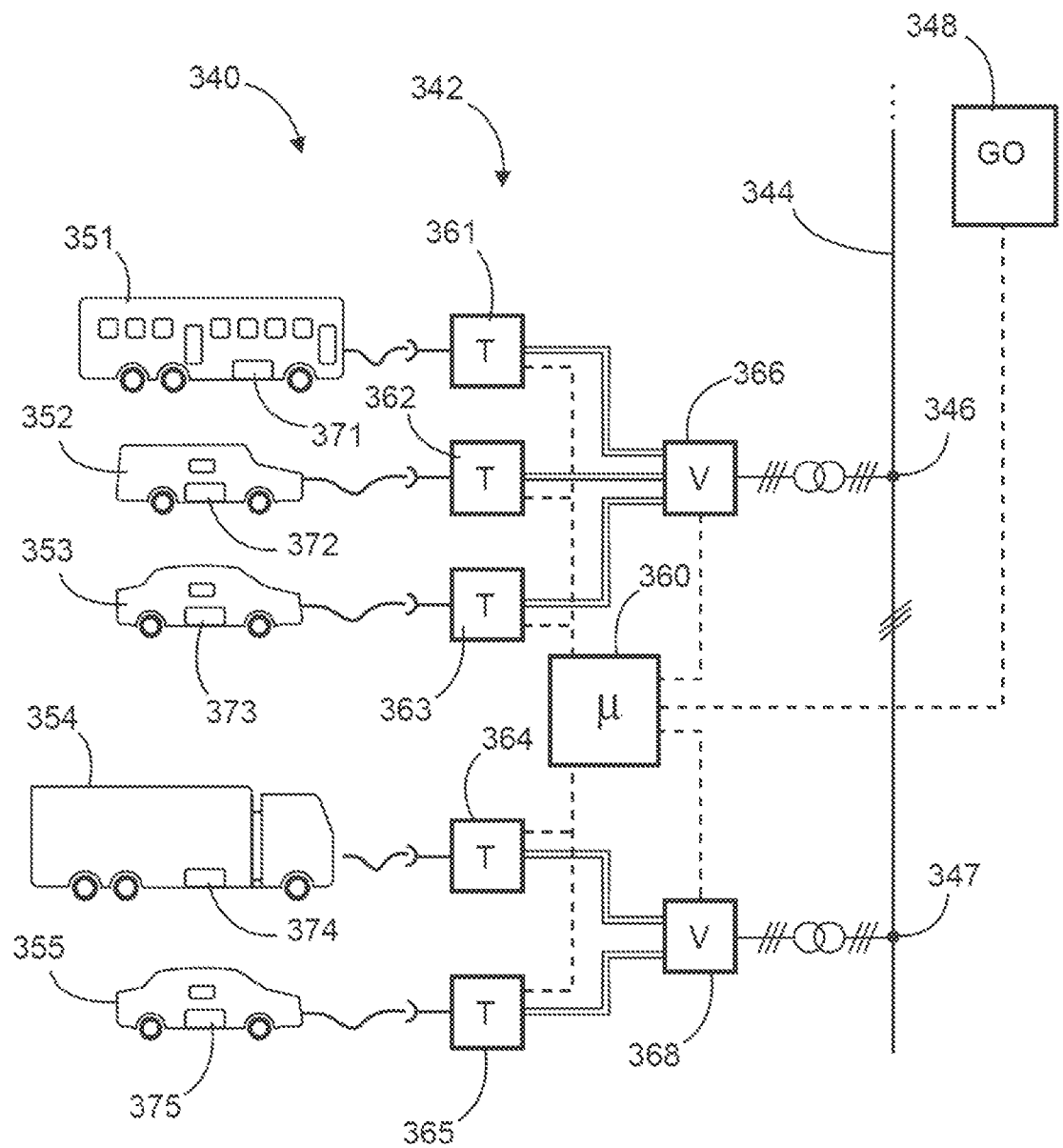
FIG. 3 schematically shows a fleet with a charging infrastructure.

FIG. 3 shows a fleet 340 with a charging infrastructure 342, which is connected to an electricity supply grid 344 by way of two grid connection points 346 and 347. The electricity supply grid has a grid controller 348, which can control the electricity supply grid 344. The grid controller 348 may also be operated by a grid operator.

The fleet 340 has by way of example five electric vehicles 351-355, which are in each case connected to one of the charging terminals 361-365. The charging terminals may be connected by way of distributor nodes 366 or 368 to the electricity supply grid 344 in each case via a grid connection point 346 or 347.

The three electric vehicles 351-353 can consequently feed power into or draw power from the electricity supply grid 344 via the grid connection point 346, and the electric vehicles 354 and 355 can feed power into or draw power from the electricity supply grid 344 via the grid connection point 347.

Nevertheless, a charging controller 360 which can activate each individual charging terminal 361-365, and thus each storage unit of the electric vehicles 351-355, is provided. Also provided as an optional possibility is that the charging controller can also activate the distributor nodes 366 and 368. It is also provided that the charging controller 360 can communicate with the grid controller 348. The charging controller 360 may for this purpose transmit information to the grid controller 348 and receive information from it. The charging controller 360 may also be referred to as a controller of the charging infrastructure, or be part of a controller.

In principle, the information connections between the charging controller 360 on the one hand and the charging terminals 361-365, the distributor nodes 366 and 368 and also the grid controller 348 are represented by dashed lines. The transmission of power or energy is possible by way of the other lines, which are depicted as solid.

The charging controller 360 may have stored information about properties of the charging infrastructure 342 and/or receive such information as present data. Furthermore, it may have stored information about properties of the electrical storage units of the electric vehicles 351-355 and, in particular by way of the charging terminals 361-365, receive and process present information about the state of charge and, if appropriate, further properties of the respective storage units of the electric vehicles 351-355.

Consequently, with the charging controller 360, altogether the exchange power that is exchanged between the charging infrastructure 342 and the electricity supply grid 344 can be controlled. This exchange power is to this extent the sum of the individual exchange powers or individual powers of the power units, which are exchanged with the electricity supply grid 344 via the grid connection point 346 and the grid connection point 347.

Electrical storage units 371-375 are also indicated in the electric vehicles 351-355 for purposes of illustration.

Electrical storage units may also synonymously be referred to simply as storage units.

Figure 4:
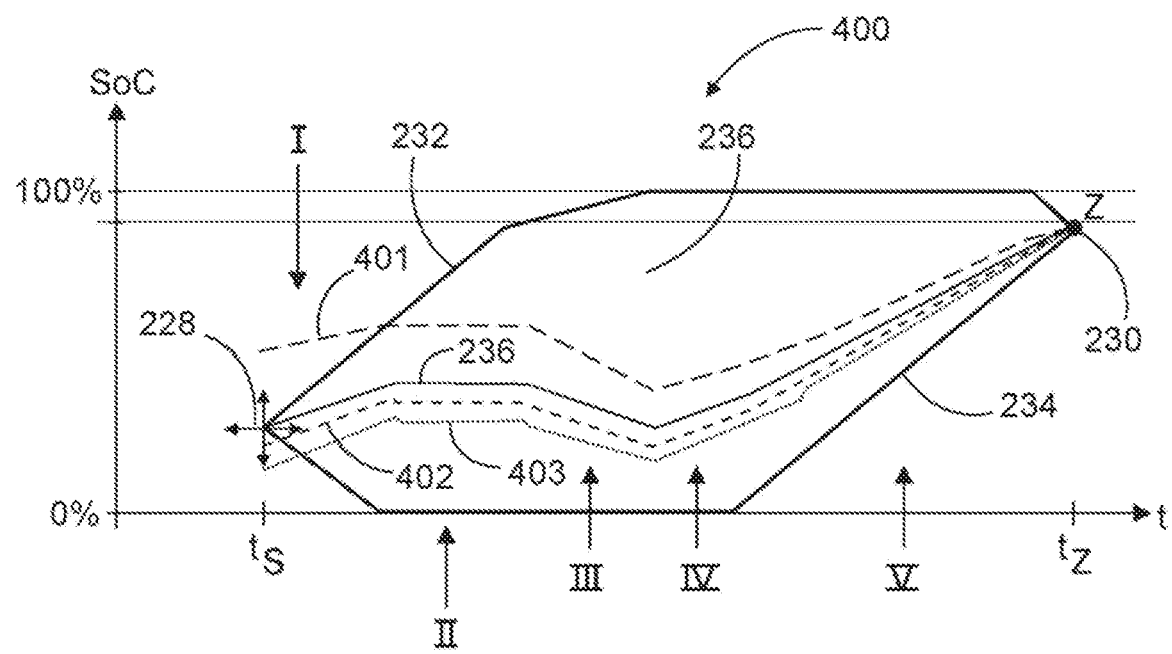
FIG. 4 shows in a schematic diagram an overall state-of-charge progression together with associated individual state-of-charge progressions.

FIG. 4 shows a state-of-charge diagram 400, which basically corresponds to the state-of-charge diagram 220 of FIG. 2, and to this extent the reference signs of some of the elements have also been taken over. In addition to the overall state-of-charge progression 236, three individual state-of-charge progressions 401-403 are depicted. The sum of these individual state-of-charge progressions consequently gives the overall state-of-charge progression 236. Since the states of charge are indicated as a percentage value, this overall state-of-charge progression 236 lies between the individual state-of-charge progressions 401-403. The absolute values of the overall state-of-charge progression 236 are of course much greater than the absolute values of the respective individual state-of-charge progressions.

The overall state-of-charge progression 236 is consequently also based on the exchange power progression 238 of FIG. 2. FIG. 4 is then an example of how the exchange power can be divided among the individual power units, here that is by way of example 3 power units.

In the example shown, the first individual state-of-charge progression 401 has at the starting charging time is a comparatively high value, which specifically lies above a mean state of charge. With the chosen percentage representation, the overall state-of-charge progression 236 corresponds to a mean state-of-charge progression.

The two individual state-of-charge progressions 402 and 403 have at the starting charging time in each case a lower individual charging state than the mean charging state 236.

The dividing of the exchange power among the 3 electric vehicles that are taken as a basis for these 3 individual state-of-charge progressions 401-403 is proposed here in such a way that the individual state-of-charge progressions 401-403 approximate to the mean state-of-charge progression. The individual state-of-charge progression 401 consequently has a smaller slope at the beginning than the mean state-of-charge progression and consequently the overall state-of-charge progression 236. On the other hand, the second and third individual state-of-charge progressions have in each case a greater rise at the beginning. This is evident in the first region I. In the second region II, no power exchange takes place. All of the progressions shown are consequently horizontal. In the following third portion III, power is drawn, and so the states of charge fall. Here, the exchange power is divided such that the first individual state-of-charge progression 401 falls at a greater rate than the second and third individual state-of-charge progressions 402 and 403. This achieves the effect that the individual states of charge also approximate to the mean state of charge during discharging.

In the following fourth region IV, power is then again charged, and here too the power is divided such that the individual states of charge approximate to the mean state of charge, or the progressions come closer together. The same applies to the fifth region V, at the end of which finally the individual state-of-charge progressions meet the mean state-of-charge progression at the target charging point 230 at the target charging time $t_z$.

It can particularly be achieved in this way that also the first individual state-of-charge progression 401, which starts with a very high initial charge, does not reach a target state of charge prematurely. Consequently, also the storage unit on which this first individual state-of-charge progression 401 is based can contribute to the power exchange over the entire control time period. Consequently, a great overall power interval can be maintained over a very long time.

It has consequently been recognized that, in a flexibility space 226, which may also be referred to as a state-of-charge range, with the possible power exchange at any point in time whatsoever and with any overall state of charge whatsoever, an equal distribution of the states of charge of the individual storage units, which may also be referred to as batteries, cannot always be assumed as a simplification. Thus, the possible exchange power at a point in time and with an overall state of charge also depends on the present individual state of charge of each individual battery. Also physical properties of the individual batteries may only be taken into consideration in a unit in an averaged form, and as a result the possible power exchange may possibly be falsified.

Also technical properties of a charging infrastructure may influence the possible exchange power. These include for example converter powers.

On the other hand, it has been recognized that the default of a flexibility space with power limits, consequently the default of an overall power space for marketing, can only take place if a simplification of the equal distribution of the states of charge with respect to the power exchange is assumed. It has however also been recognized that, while taking into consideration the power distribution specification, the progression of the individual states of charge can be traced, and consequently can be known. Consequently, the individual states of charge can always be determined, with them the individual power intervals and with them also the overall power intervals. As a result, the overall power interval can therefore be determined for each range point in the flexibility range.

It has therefore been recognized that it may be important to have exact knowledge of the method for dividing the power, that is to say be familiar with the power distribution specification. It has also been recognized here that there may also be a possibility of predefining the charging power in a weighted manner in dependence on a difference in each case of an individual state of charge from the state of charge to be reached. In addition, this may be predefined in dependence on the battery size, at least if the respective charging power is not predefined as a percentage value, but as an actual power value. Here it should be taken into consideration that an overall charging energy, that is to say a requested exchange energy, has been predefined in order to obtain a desired overall state of charge at the end of the control time period. This can be used to calculate a charging schedule, which specifically predefines the distribution of the exchange power among the connected power units.

Here it has been recognized that it is advantageous if the share of the individual charging power of the individual batteries is proportional to the present disparity of the individual state of charge from the target state of charge. For the default of absolute power values, the battery size is then additionally to be taken into consideration, and the power can in this case be predefined in each case proportionally to it. As a result, each storage unit or each battery can be assigned just as much of the available exchange power as is necessary to bring all of the batteries continuously to the target state of charge.

In addition, a statistical maximum power of a battery at each operating point should be taken into consideration as a limitation. If, however, a limitation of a charging power of a system has the effect that the power schedule, that is to say the overall state-of-charge progression, cannot be followed, the target value of the other systems would have to be raised. The power may then therefore be distributed differently.

With a known method of dividing the power, that is to say a known power distribution specification, consequently the individual state-of-charge progressions are also known. These may also be referred to as paths within the flexibility space, as they are shown in FIG. 4 as individual state-of-charge progressions 401-403. It is consequently then also possible in each case for the individual power interval of the corresponding storage unit to be determined, and consequently also the overall power interval of all of the storage units in relation to each range point.

It is alternatively or additionally also conceivable to control the individual charging power of each storage unit or each battery in an initial phase in such a way that a uniform individual state of charge is reached as quickly as possible. In this way it can be achieved that it would only be necessary for the individual states of charge or the individual power required for them to be taken into consideration in an initial phase for reaching a uniform state of charge.

Should it be found that the requested energy is too great or too small to reach the target state of charge, at favorable points in time compensation energy may be drawn or fed in, or a corresponding procurement set. It is consequently possible by timely planning still to select here nevertheless favorable points in time for obtaining this compensation energy. Even for individual systems, that is to say individual storage units, it should be reviewed at all times whether the target state of charge can still be reached. Especially in the case of low states of charge, it may be that the necessary gradient, that is to say the necessary charging power, becomes too great for an individual system.

Figure 5:
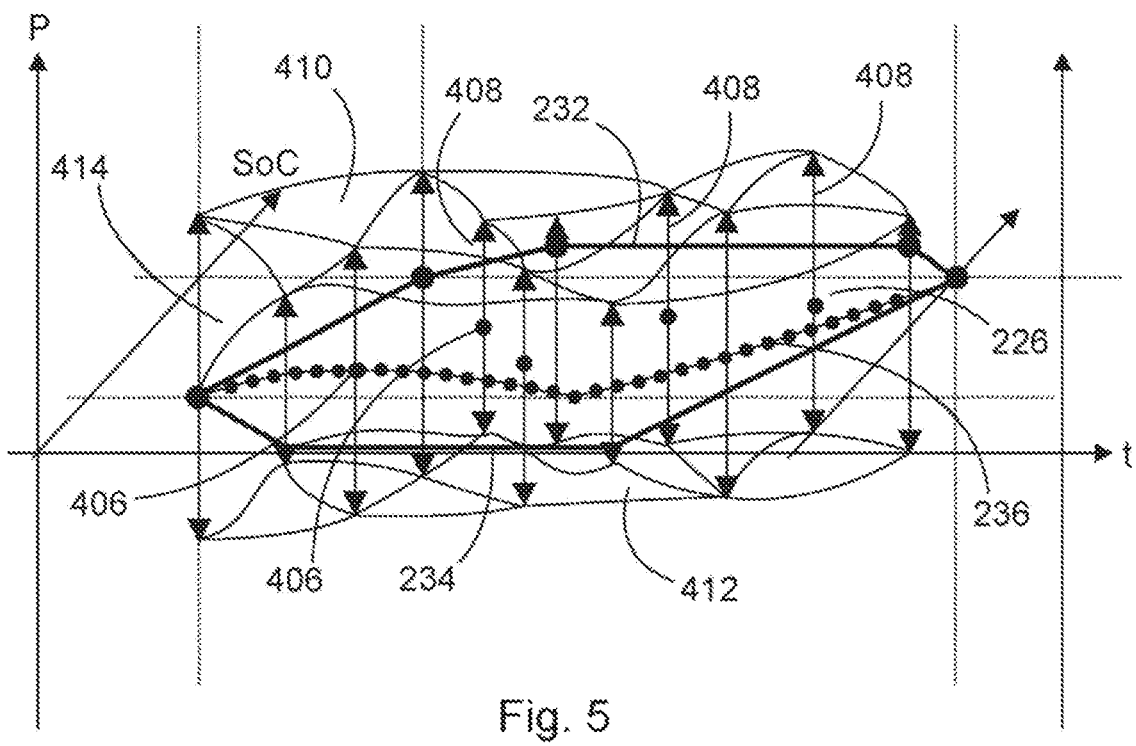
FIG. 5 illustrates a default power space.

FIG. 5 is based on the variation diagram 222 and consequently also on the state-of-charge diagram 220 of FIG. 2. The reference signs have to this extent been taken over in a relevant manner. To this extent, the diagram of FIG. 5 contains the flexibility range 226, the upper limit 232 and lower limit 234 of which are shown in the representation by a thicker line. In the flexibility range 226, the overall state-of-charge progression 236, which is otherwise also shown in FIG. 4, is emphasized in FIG. 5 by additional points. This consequently has representational reasons, but the points also indicate moreover that each point on the overall state-of-charge progression is a range point of the flexibility range. For the sake of better clarity, only some of these range points 406 are provided with reference signs.

For each depicted range point 406, that is to say also those that do not bear a reference sign, there is respectively shown a double-headed arrow, which in each case symbolizes an overall power interval 408. The overall power intervals 408 may be of different sizes, but for the sake of simplicity they bear the same reference sign. A range point 406 consequently lies in the plane of the flexibility range 226, and that may be on the overall state-of-charge progression 236, or at a different location in the flexibility range 226. Each overall power interval 408 consequently marks by the upward arrow an upper limit for the exchange power and by the downward arrow a lower limit for the exchange power of the respective range point. These overall power intervals or the respective power limits have consequently been entered into the diagram of FIG. 5 as a third dimension. All of the upper limits of the overall power intervals 408 together span an area which for illustrative reasons has already been referred to above as an arch.

All of these upper limits together consequently together form an upper power area 410. By connecting the upper limits of the overall power intervals 408 shown, it is intended to indicate this upper power area 410.

There is correspondingly a lower power area 412 for the lower power limits of the overall power intervals 408. It too is intended to be illustrated by connecting lines between lower power values of the depicted overall power intervals 408.

In this way, a default power space 414 is obtained between the upper power area 410 and the lower power area 412. An overall power space is of quite a similar construction to the default power space; they are basically the same, but with the difference that the default power space is based on overall power intervals with specific assumptions, specifically based on unfavorable preconditions.

Particularly, such a default power space 414 may be provided for the purpose of determining an exchange power progression 238. Such an exchange power progression 238 is shown at the bottom in FIG. 2 and its power values must stay in the default power space 414. Based on FIG. 5, this would graphically mean that the power progression 238 of FIG. 2 would be plotted along the overall state-of-charge progression 236, specifically with time as the basis. As long as this exchange power progression 238 then neither goes above the upper power area 410 nor goes below the lower power area 412, there is an admissible exchange power progression 238. In other words, this default power space 414 can be used to predefine an exchange power progression 238 in such a way that it lies in this default power space 414.

Figure 6:
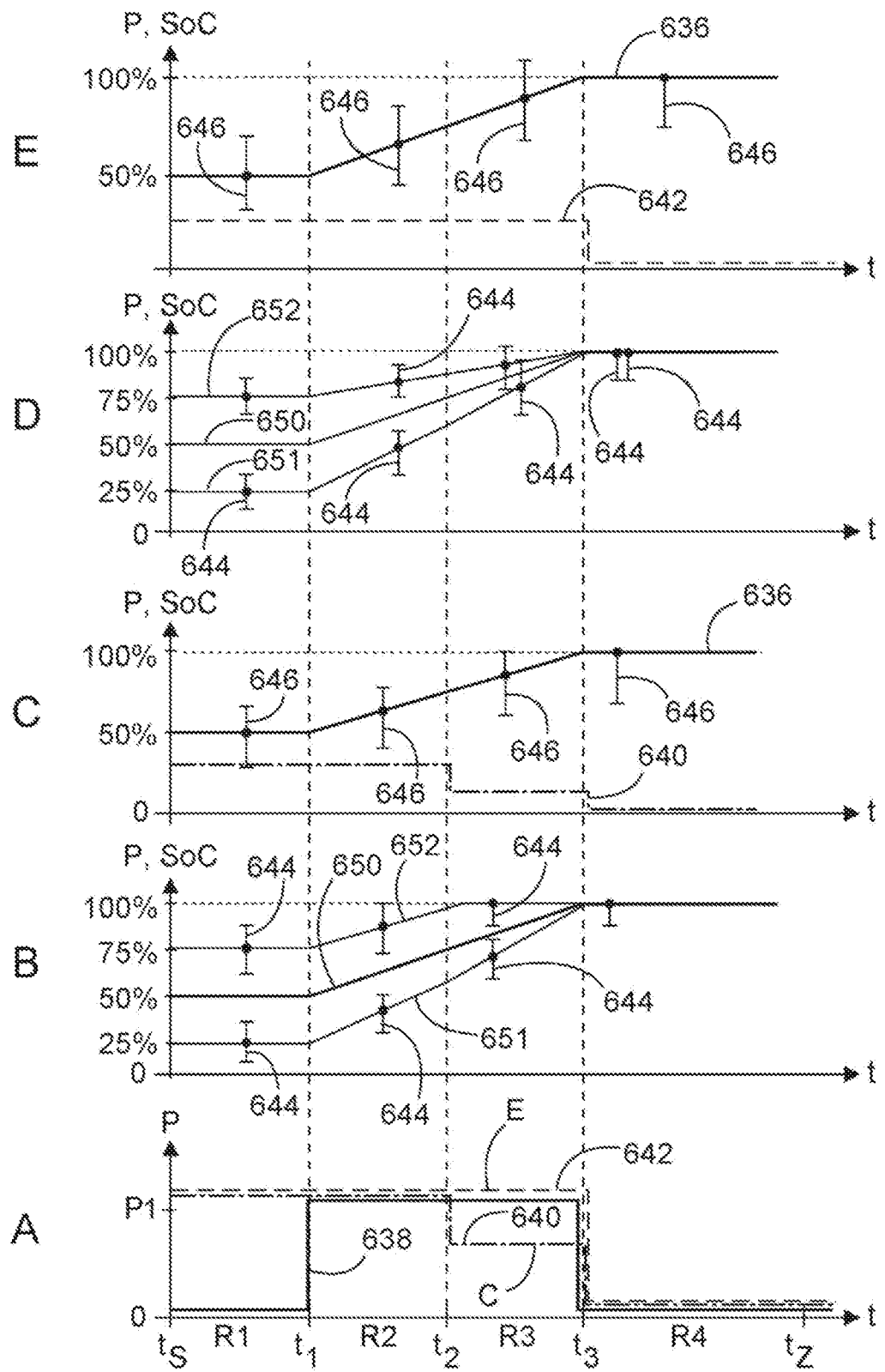
FIG. 6 shows a number of diagrams for illustrating a power distribution specification.

FIG. 6 shows diagrams for illustrating a power distribution specification. Provided for this are five diagrams A-E, which have the same time basis.

According to the lower diagram A, an exchange power progression 638 is predefined. Assumed here for the purpose of illustration is a very simple progression, in which specifically the exchange power rises at the time t1 to the value P1 and continuously maintains this value and falls at the time t3 to 0. The area content of the resultant rectangle of the exchange power progression 638 consequently corresponds to a requested exchange energy, which is intended to be provided by this exchange power according to the exchange power progression 638.

In addition, diagram A also contains two possible power limits 640 and 642, which result from diagram C or E, as further explained below.

It is therefore assumed that there are only two electrical storage units, that is to say two electric vehicles, and they can be assigned a first individual power progression 651 and a second individual power progression 652. These have an individual state of charge of 25% and of 75%, respectively. These two individual states of charge are taken as a basis here for all of the diagrams, and are correspondingly represented in particular in diagrams B and D.

In diagram B, it is therefore assumed that there is a power distribution specification which divides the exchange power in equal parts respectively to two power units. The two individual power progressions 651 and 652 consequently extend initially horizontally; up to the time $t_1$, charging is carried out and they receive an equal amount of power for charging. Consequently, the two individual power progressions 651 and 652 rise with the same slope, consequently parallel to one another. Likewise shown is a mean state-of-charge progression 650. On account of the percentage representation, the mean state-of-charge progression 650 corresponds to an overall state-of-charge progression.

This mean state-of-charge progression, and consequently the overall state-of-charge progression, consequently rises linearly as a result of the constant exchange power, specifically from the time $t_1$ to the time $t_3$. At the time $t_2$, however, the second individual state-of-charge progression 652 reaches the value of 100%. The corresponding storage unit is then therefore fully charged. Correspondingly, the remaining storage unit must be charged twice as quickly, which is indicated by the greater slope of the first individual state-of-charge progression 651.

In addition, individual power intervals 644 are depicted. For the sake of simplicity, the same reference sign 644 is also used for different partial power intervals. In the first region R1 between the starting time $t_s$ and the time t1, these partial power intervals 644 have maximum values. The same applies in the second region R2, which lies between $t_1$ and $t_2$. From $t_2$, that is to say in the region R3, the second partial power progression 652 has however already reached its maximum value, the storage unit is therefore full, and consequently its partial power interval 644 is reduced there, then only allowing discharging power, but no longer charging power. For this reason, the entire exchange power must then be taken up from the remaining storage unit.

The first individual state-of-charge progression 651 consequently becomes steeper. The sum of the partial power intervals 644 in each case gives an overall power interval 646. For this, an overall state-of-charge progression 636 with the resultant overall power intervals 646 is depicted in diagram C. The overall power intervals 646 are consequently still great both in the first region R1 and in the second region R2. At the point in time $t_2$, however, the positive part of the partial power interval 644 of the second individual state-of-charge progression 652 is eliminated. Consequently, the overall power interval 646 in the third region R3 is correspondingly smaller. In the fourth region R4, that is to say between $t_3$ and $t_z$, the two storage units have been charged and there is no positive component any more in the overall power interval.

Since therefore only the upper power limit is to be illustrated, since here only charging is considered, in diagram C a corresponding power progression is depicted by dot-dashed lines as a power limit 640. This power limit 640 consequently falls at $t_2$ to half its value and at $t_3$ to 0. This power limit 640 is however the limit that the exchange power must maintain. This power limit 640 of diagram C is correspondingly depicted in diagram A, on a somewhat different scale. It can be seen that, in the third region R3, the exchange power progression 638 actually lies above the power limit 640. Consequently, this power limitation has been infringed and the described progression would not be possible, or at least not desirable.

Diagram D shows an alternative variant in this respect, specifically a different power distribution specification. For the sake of better clarity, the same reference signs as in diagram B are used. The same exchange power is intended to be distributed among the two storage units, which is shown in diagram A as exchange power progression 638. There are also the same starting conditions. At point in time $t_1$, the exchange power is then to be distributed among the two storage units.

For this, however, it is then intended to distribute the exchange power in such a way that the individual state-of-charge progressions, that is to say the first and second individual state-of-charge progressions 651 and 652, come to match the mean state-of-charge progression. In the region R2, consequently, the second individual state-of-charge progression has a smaller slope than the first individual state-of-charge progression 651. This has the effect that, unlike in diagram B, the second individual state-of-charge progression 652 has not yet reached its limit at the point in time $t_2$. At the point in time $t_2$, and consequently also thereafter in the third region R3, the two storage units have still not been charged. Consequently, the partial power intervals 644 in the third region R3 are also still of the same size for the first individual state-of-charge progression 651 and the second individual state-of-charge progression 652.

It is not until the point in time $t_3$, and then continuing in the fourth region R4, that power cannot be taken up any longer; the two partial power intervals 644, which in diagram D are shown alongside one another in the fourth region R4, lose their positive region. The two storage units are then fully charged.

Also for this distribution specification, diagram E shows an overall state-of-charge progression 236 with assigned overall power intervals 646. The overall state-of-charge progression 236 is of course the same in diagrams E and C. However, there is a difference in the overall power interval 646 in the third region R3. Specifically, in the case of the variant of diagrams D and E, it is not yet restricted. Also in diagram E, a power limit 642, which consequently does not fall in the region R3 but not until after the point in time t3, and consequently in the region R4, is depicted as a dashed line for purposes of illustration. It was therefore possible for the power limit to be maintained.

This power limit 642 of the second variant of the power distribution specification is likewise depicted in diagram A "here, too, again on a greater scale than in diagram E), and it is evident that therefore the exchange power progression 638 remains completely below this power limit 642 of diagram E. The power limit is therefore not infringed here.

It is consequently evident that a different way of dividing the power can alone lead to whether or not a power limit is infringed by the exchange power. This is a result of different individual state-of-charge progressions 651, 652 leading to the same overall state-of-charge progression but possibly producing different overall power intervals 646. The skillful way in which the power is divided according to a correspondingly proposed power distribution specification consequently improves the possible power range for an exchange power progression. Moreover, this power distribution specification can be taken into consideration during planning, in particular also when predefining a default power space. With a correspondingly good power distribution specification, consequently a correspondingly greater default power space is obtained.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a power exchange between a charging infrastructure and an electricity supply grid, wherein:

a plurality of power units are configured to be connected to the charging infrastructure for delivering or drawing electrical power to exchange electrical power between the plurality of power units and the electricity supply grid via the charging infrastructure, and a number of the plurality of power units are in each case an electric vehicle, and so a plurality of electric vehicles are configured in each case to be connected to the charging infrastructure to exchange electrical power between the plurality of electric vehicles and the electricity supply grid via the charging infrastructure and thereby charge or discharge the plurality of electric vehicles, each power unit of the plurality of power units has a variable state of charge, which in each case is configured to be taken into consideration as an individual state of charge when the respective power unit is connected to the charging infrastructure, the method comprising:

from the individual states of charge of the plurality of power units, determining an overall state of charge, and predefining for a control time period, for the overall state of charge, a flexibility range which spans a range, in dependence on time, in which the overall state of charge may occur, wherein the flexibility range is spanned by a progression over time of an upper limit of the overall state of charge and a progression over time of a lower limit of the overall state of charge for the control time period, wherein the flexibility range has range points which in each case are able to be defined by a value of the overall state of charge and a point in time in the control time period, wherein a range point is in each case assigned an overall power interval, wherein the overall power interval predefines in relation to the point in time and in relation to the overall power of the range point a range to be maintained for an overall exchange power to be exchanged between the charging infrastructure and the electricity supply grid, wherein the overall power intervals of all of the range points span an overall power space over the flexibility range that is to be maintained for the overall exchange power, and wherein the overall power interval of a range point depends on the individual states of charge of the power units on which the overall state of charge of the range point is based.

2. The method as claimed in claim 1, wherein:

an individual state of charge of a power unit is in each case assigned an individual power interval, which predefines for this individual state of charge a range to be maintained for the individual exchange power that the power unit can exchange with the charging infrastructure, and the overall power interval of a range point is in each case created in dependence on recorded, calculated and/or predicted individual states of charge of the range point and their assigned individual power intervals.

3. The method as claimed in claim 1, comprising:
determining, for the determination of each overall power interval, in each case a positive overall power limit and a negative overall power limit are determined, in each case to take into consideration an asymmetry of the overall power interval,
   wherein the positive overall power limit limits the power that the charging infrastructure can draw as a maximum, and
   wherein the negative overall power limit limits the power that the charging infrastructure can deliver as a maximum.

4. The method as claimed in claim 1, wherein the respective overall power interval is in each case determined in dependence on:
   a recorded or predicted initial overall state of charge, which corresponds to the overall state of charge at the beginning of the control time period, and/or
   a recorded or predicted initial individual states of charge, which designate the individual states of charge at the beginning of the control time period, and
   a power distribution specification, which predefines how an overall exchange power is divided among the individual power units.

5. The method as claimed in claim 1, comprising:
determining a default range for predefining an exchange power progression, wherein:
   the default range corresponds to the flexibility range or forms part of the flexibility range, and
   the default range has a plurality of range points, wherein assigned to the plurality of range points in each case is an overall state of charge with a default power interval,
   the default power intervals span an admissible default power space over the default range in which the exchange power progression is intended to lie,
   each default power interval forms an overall power interval,
   at least some of the default power intervals in each case are determined in dependence on:
      an unfavorable constellation of all of the individual states of charge of the range point, and/or
      an unfavorable exchange power progression.

6. The method as claimed in claim 1 comprising defining an exchange power progression in dependence on a prediction range such that the exchange power progression lies within the default power space.

7. The method as claimed in claim 1, wherein, for the control time period
   a requested exchange energy is given, indicating energy that the charging infrastructure has requested for the control time period for charging the plurality of power units,
   in a power determining step, determining an exchange power progression in dependence on the requested power progression, wherein the exchange power progression predefines a progression of the exchange power for the control time period,
   in a progression determining step, predefining an overall state-of-charge progression over time in dependence on the exchange power progression,
   in an interval determining step, determining overall power intervals for range points of the overall state of charge, and
   in a checking step, reviewing whether the exchange power progression predefined in the power determining step stays within the overall power intervals that have been predefined in the interval determining step.

8. The method as claimed in claim 1, wherein:
   a power distribution specification, which predefines how an overall exchange power is divided among the individual power units, predefines the dividing of the overall exchange power among the individual power units in such a way that individual states of charge approximate to a mean state of charge of all the power units that are connected to the charging infrastructure, and/or
   the method comprising reducing a standard deviation of the individual states of charge.

9. The method as claimed in claim 1, comprising determining or changing overall power intervals in dependence on electric vehicles arriving or departing during the control time period.

10. The method as claimed in claim 1, wherein a power distribution specification, which predefines how an overall exchange power is divided among the individual power units, predefines the dividing of the overall exchange power among the individual power units in such a way that:
   a positive partial exchange power with which a power unit is in each case charged is determined in dependence on a difference of the individual state of charge from a state of charge to be reached, in particular a fully charged state of charge, and
   a negative partial exchange power with which the power unit is discharged is determined in dependence on a difference of the individual state of charge from a discharged state of charge, and/or
   with the default of a positive exchange power, in the case of which power is drawn from the electricity supply grid for charging the plurality of power units, the plurality of power units that have a state of charge below a or the relative mean state of charge are charged with priority and/or are charged to a greater extent than power units that have a state of charge above the relative mean state of charge, and
   with the default of a negative exchange power, in the case of which power is fed into the electricity supply grid for discharging the plurality of power units, the plurality of power units that have a state of charge above the relative mean state of charge are discharged with priority and/or discharged to a greater extent than power units that have a state of charge below the relative mean state of charge.

11. The method as claimed in claim 7, comprising:
reviewing an overall state-of-charge progression over time, to determine:
   whether a target overall state of charge predefined at an end of the control time period as the overall state of charge to be reached can be reached, and/or
   whether target individual states of charge predefined for individual states of charge to be reached at the end of the control time period can be reached,
   wherein the respective review is carried out at one or more checking points in time in the control time period, and/or in response to detecting that the target overall state of charge or at least a target individual state of charge cannot be reached, the method comprising:
changing the overall power progression,
changing the exchange power progression, and/or
adapting the power distribution specification.

12. The method as claimed in claim 1, wherein:
for a control time period, and
in relation to a planning point in time that occurs before the control time period, the method comprising:
determining the flexibility range with the overall power space and/or a default range having default power space by the charging infrastructure for the planning of an exchange power progression and is transferred to an external unit,
in the external unit, predefining an exchange power progression in dependence on the flexibility range and/or the default range for the control time period, and
in the control time period, carrying out a power exchange between the charging infrastructure and the electricity supply grid according to the predefined exchange power progression.

13. A charging infrastructure comprising a controller having at least one interface for exchanging information, wherein the controller is configured to cause the method as claimed in claim 1 to be performed.

14. The method as claimed in claim 2 wherein the overall power interval corresponds essentially to a sum of the individual power intervals.

15. The method as claimed in claim 3 wherein the individual power intervals in each case are assigned a positive individual power limit and a negative individual power limit.

16. The method as claimed in claim 5 wherein each default power interval forms a predicted overall power interval which has been predicted in dependence on:
a prediction of an initial overall state of power and/or
a prediction of initial individual states of charge.

17. The method as claimed in claim 6 comprising on request, checking whether a proposed exchange power progression, which at least partially does not lie within the default power space, lies within the overall power space.

18. The method as claimed in claim 7, wherein:
while taking into consideration the overall power interval determined in the interval determining step, the power determining step is repeated if it has been found in the checking step that the exchange power progression has not stayed within the overall power intervals, and
the progression determining step, the interval determining step and the checking step are repeated as often as it takes until it has been found in the checking step that the predefined exchange power progression stays within the overall power intervals, or
the progression determining step, the interval determining step and the checking step are transferred into a closed default algorithm without iteration, and the predefining of the exchange power progression takes place while taking into consideration the overall power intervals by means of the default algorithm.

* * * * *